United States Patent
Kaever et al.

(10) Patent No.: US 8,090,463 B2
(45) Date of Patent: Jan. 3, 2012

(54) OPERATING METHOD FOR AN EVALUATION DEVICE FOR A PRODUCTION MACHINE

(75) Inventors: Michael Kaever, Erlangen (DE); Volker Maier, Düsseldorf (DE)

(73) Assignee: Siemens Aktiengsellschaft, Munich (DE)

( * ) Notice: Subject to any disclaimer, the term of this patent is extended or adjusted under 35 U.S.C. 154(b) by 420 days.

(21) Appl. No.: 11/921,263

(22) PCT Filed: May 29, 2006

(86) PCT No.: PCT/EP2006/062684
§ 371 (c)(1),
(2), (4) Date: Mar. 23, 2009

(87) PCT Pub. No.: WO2006/128848
PCT Pub. Date: Dec. 7, 2006

(65) Prior Publication Data
US 2010/0222912 A1 Sep. 2, 2010

(30) Foreign Application Priority Data
Jun. 3, 2005 (DE) .......................... 10 2005 025 673

(51) Int. Cl.
*G06F 19/00* (2011.01)
(52) U.S. Cl. ............ 700/108; 700/12; 702/182; 702/187
(58) Field of Classification Search .................. 700/11, 700/12, 95, 108, 159, 160, 174, 180, 182; 702/187, 182; 318/560
See application file for complete search history.

(56) References Cited

U.S. PATENT DOCUMENTS

| | | | | |
|---|---|---|---|---|
| 5,822,212 | A | * | 10/1998 | Tanaka et al. .................. 700/174 |
| 6,237,050 | B1 | * | 5/2001 | Kim et al. ......................... 700/28 |
| 6,728,657 | B2 | * | 4/2004 | Nakamura ..................... 700/174 |
| 6,738,747 | B1 | * | 5/2004 | Tanaka et al. .................... 700/95 |
| 2002/0156542 | A1 | | 10/2002 | Nandi |
| 2003/0014149 | A1 | * | 1/2003 | Kreidler et al. ............... 700/169 |
| 2003/0027363 | A1 | * | 2/2003 | Kodama .......................... 438/14 |

FOREIGN PATENT DOCUMENTS

| | | |
|---|---|---|
| DE | 10124132 A1 | 2/2002 |
| JP | 61025753 A | 2/1986 |
| JP | 2029894 A | 1/1990 |
| JP | 5149763 A | 6/1993 |
| JP | 2000153431 A | 6/2000 |
| JP | 2000512378 A | 9/2000 |
| JP | 2002373022 A | 12/2002 |
| JP | 2003195934 A | 7/2003 |
| WO | WO 03/073186 A1 | 9/2003 |

* cited by examiner

*Primary Examiner* — Charles Kasenge

(57) ABSTRACT

During the production of a product by means of a production machine, an evaluation device receives actual states of components of the production machine, detected by sensors at detection times, and/or operating states of a control device of the production machine at the defined detection times. The evaluation device compares the states of each detection time transmitted thereto with pre-defined state combinations and thus determines fulfilled state combinations. For each fulfilled state combination, the evaluation device selects relevant states from the states of the respective detection time transmitted thereto, and corresponding information and the respective detection time are stored with the relevant states such that they are available for other evaluations.

6 Claims, 3 Drawing Sheets

OPERATING METHOD FOR AN EVALUATION DEVICE FOR A PRODUCTION MACHINE

CROSS REFERENCE TO RELATED APPLICATIONS

This application is the US National Stage of International Application No. PCT/EP2006/062684, filed May 29, 2006 and claims the benefit thereof. The International application claims the benefits of German application No. 10 2005 025 673.2 DE filed Jun. 3, 2005, both of the applications are incorporated by reference herein in their entirety.

FIELD OF INVENTION

This invention relates to an operating method for an evaluation device for a production machine, especially a machine tool, which manufactures a product under the control of a control device.

BACKGROUND OF INVENTION

Such production machines are generally known. These include a large variety of production machines, mainly machine tools. Products are manufactured by these production machines under the control of the control device. They have a number of mechanical, electrical, hydraulic etc. components.

Due to the variety of components, there is a problem in the operation of such production machines of being able to predict in time when and which component needs to be replaced or serviced. Such predictions are at present still very difficult and inexact. For example, the detection and evaluation of raw data depends on operating states. Furthermore, there is frequently only little discriminatory information available. A further problem can exist in that the raw data is only indirectly suitable for the component to be monitored. For example, currents for drives are used in order to obtain information on axle bearing damage. Furthermore, the raw data evaluation is frequently not of sufficient quality because additional information cannot be used in the evaluation.

According to prior art, damage prediction and damage assessment depend mainly on the experience of a service technician. Therefore, component replacements are also regularly carried out prematurely to enable unpredicted shutdown times to be avoided. Servicing intervals, for example, are also chosen that are shorter than would actually be technically necessary.

SUMMARY OF INVENTION

An object of this invention is to provide the possibility, using the wear states of their components, of making production machines more reliable than was previously possible and/or of making the prediction of failures of components of production machines more reliable than previously and/or, in the event of a failure, enabling the causes of damage to be more reliably diagnosed than previously.

The object is achieved by a technical procedure consisting of operating procedures for an evaluation device for a production machine, in that during the manufacturing of a product by means of a production machine, the evaluation device receives actual states of components of the production machine, detected by sensors at detection times, and/or operating states of the control device of the production machine at the detection times, in that the evaluation device compares the states of each detection time transmitted thereto with pre-defined state combinations and thus determines fulfilled state combinations, in that for each fulfilled state combination, the evaluation device selects relevant states from the states of the respective detection time transmitted thereto, and stores corresponding information and the respective detection time with the relevant states of said detection time so that they are available for other evaluations.

It is therefore especially possible that the evaluation device initially determines that the preconditions for certain evaluations are present (pre-defined state combinations). The corresponding information is then stored only if the preconditions are present.

With respect to data, the object is achieved by a data carrier with a computer program stored on the data carrier for an evaluation device for determining such an operating method.

With regard to a device, the object is achieved by a production machine with components, a control device and an evaluation device, with the components, the control device and the evaluation device being connected to each other for data processing purposes in such a way that the production machine can be controlled by the control device so that a product can be manufactured by the production machine, with such an operating method being implementable by the evaluation device during the manufacturing of the product by the production machine.

If the corresponding information contains relevant states detected at the respective detection point, the determination of the corresponding information is particularly simple. Furthermore, in this case the history of the production machine is immediately available separately for each pre-defined state combination for evaluation.

Alternatively or additionally, it is also possible for the evaluation device to perform a pre-evaluation of the relevant states detected at the respective detection time and for the corresponding information to include the pre-evaluation results determined as part of the pre-evaluation. In this case, not only are the relevant states themselves present but also information already derived (pre-evaluated) from these, so that the further evaluation can be accomplished more simply, faster and more easily. Advantageously, the evaluation device determines the pre-evaluation results exclusively on the basis of the relevant states detected at the respective detection time. If the evaluation device determines the final evaluation results as part of the further evaluation using the information corresponding to the relevant states, further actions can be taken by the evaluation device. For example, the likelihood of failures, probable causes of failures, residual service lives etc, can be determined.

The additional information can include actual states of components of the production machine detected at least one other detection time and/or operating states of the control device detected at least one other detection time. This enables trends or time patterns, for example, to be determined.

Alternatively, or additionally, the additional information can also be static information on the production machine, for example empirical values on a number of production machines of similar construction.

The evaluation device preferably compares the final evaluation results with pre-defined reference results. Examples of reference results are the recorded results of at least one previous operation or the results from a corresponding model of production machine or production process.

For each final evaluation result that corresponds to one of the reference results,
- a message corresponding to the respective reference result is output to an operator of the production machine so that he can perceive this directly with his sense organs,
- controlled information is output to the control device so that it can control the production machine relative to the received control information and/or
- information is transmitted via a computer-computer connection to a remote computer.

This makes the operation of the evaluation device particularly convenient for the operator. Examples of the messages output to the operator can be servicing requests or information on probable causes of defects. The information transmitted to the remote computer can be the same information or, for example, order data.

BRIEF DESCRIPTION OF THE DRAWINGS

Further advantages and details are given, in conjunction with the drawings, in the following description of an exemplary embodiment. The drawings are as follows.

DETAILED DESCRIPTION OF INVENTION

Figure 1:
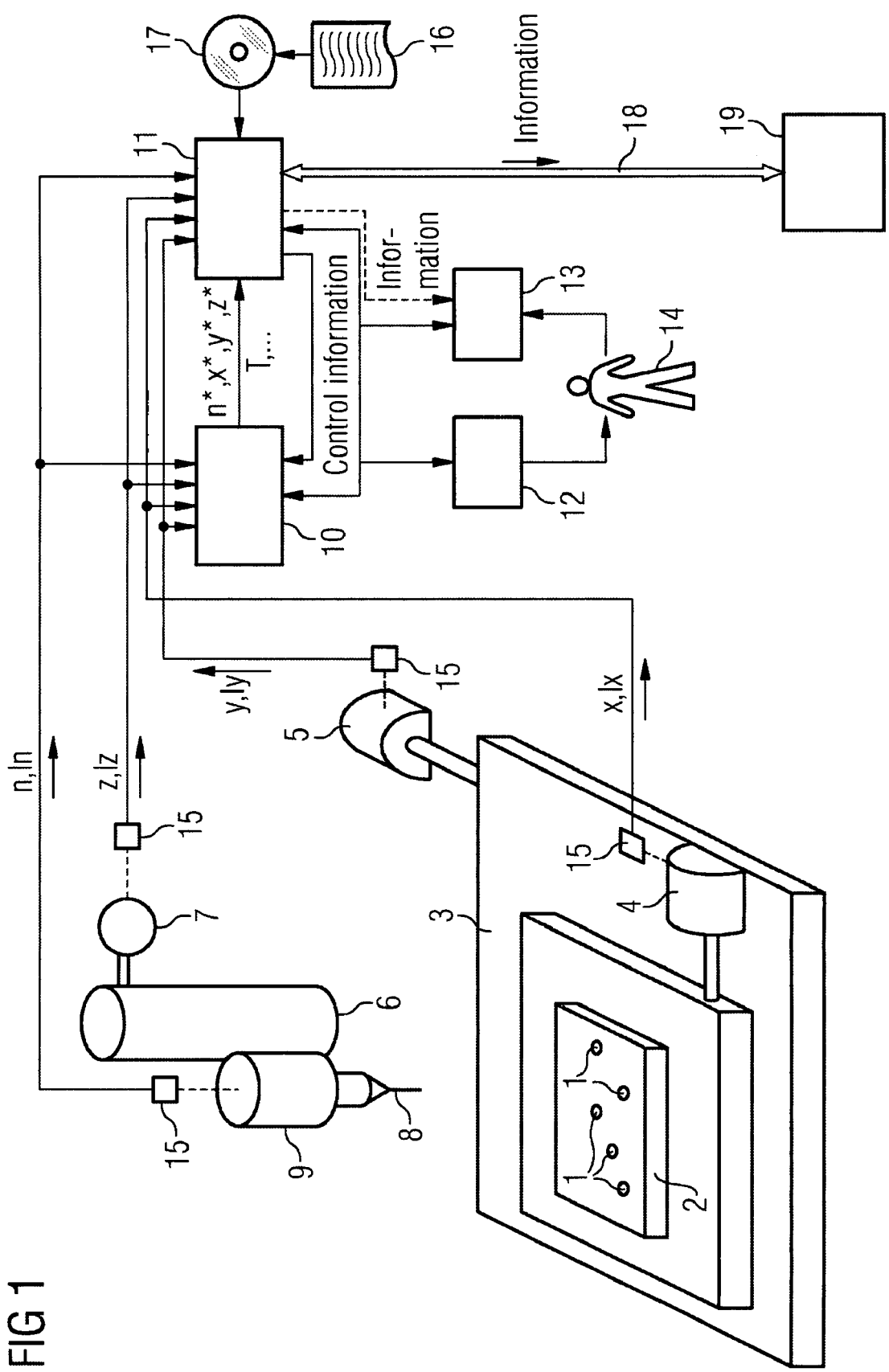
FIG. 1 A general layout of a production machine

As an example of a production machine, FIG. 1 shows a simple machine tool, i.e. a drilling machine. By means of the drilling machine it is possible for example to drill holes 1 in a workpiece 2. The drilling of the holes 1 in the workpiece 2 corresponds to the manufacturing (or machining) of the product 2.

For this purpose, purely as an example, the workpiece 2 is arranged on a workpiece holder 3 that can be positioned in an xy plane by means of drives 4, 5. A drilling device 6 has a drill drive 7 by means of which a drill 8 can be lowered onto the workpiece 2 and raised from same. Furthermore, a rotary drive 9 for rotating the drill 8 is, of course, also present. Not shown in FIG. 1 are for example a gripper for feeding and removing the workpiece 2 and a tool changer for changing the drill 8.

The various drives 4, 5, 7, 9 of the drilling machine are controlled by a control device 10. The drilling machine manufactures the workpiece 2 under the control of the control device 10. The control device 10 is programmed for this purpose by a computer program, which is not significant in the context of this invention.

Furthermore, an evaluation device 11, a display unit 12 and an input device 13 are present. The evaluation device 11 and the control device 10 are connected to the display unit 12 and the input device 13, so that both the control device 10 and the evaluation device 11 can communicate with an operator 14 of the drilling machine. If necessary, the control device 10 and the evaluation device 11 can also be combined in a unit.

The control device 10 is connected to drives 4, 5, 7, 9 of the drilling machine and to the other components of the drilling machine in order to control these. The term control device is to be taken as a broad term. For example, it includes the secondary drive control of the drives 4, 5, 7, 9. The evaluation device 11 is in turn connected to the drives 4, 5, 7, 9 of the drilling machine and with the control device 10, so that the control device 10 can receive states from these. In the case of components 4, 5, 7, 9, these states are actual states that are detected by sensors 15 assigned to the components 4, 5, 7, 9.

The evaluation device 11 performs an operating procedure during the manufacturing or machining of the workpiece 2. The operating procedure in this case is specified by a computer program 16 that is supplied to the evaluation device 11 via a data carrier 17 on which the computer program 16 is stored. Examples of a data carrier 17 of this type are a CD-ROM 17 (not illustrated) or a USB memory stick.

Figure 2:
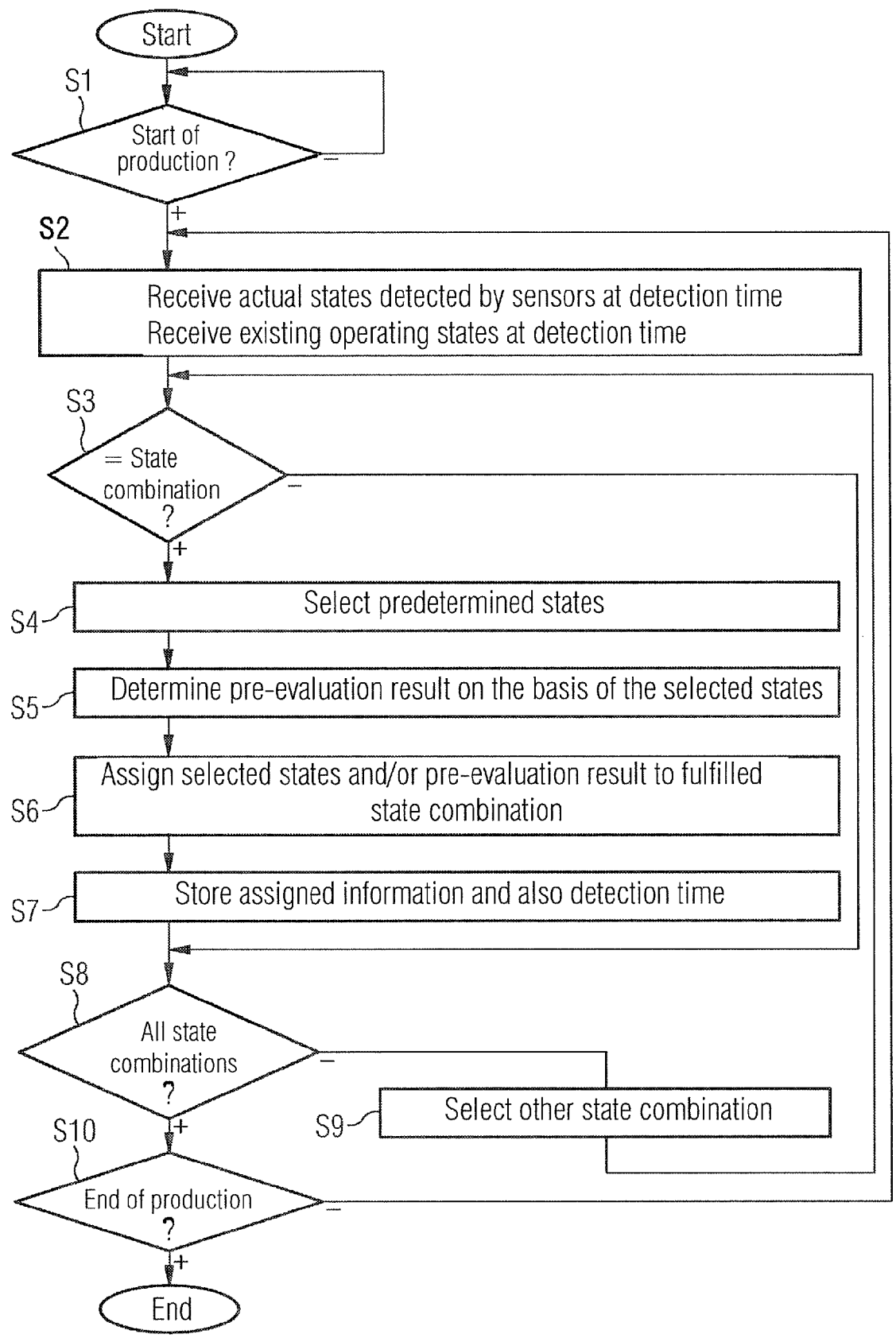
FIGS. 2 and 3 Flow diagrams

According to FIG. 2, the evaluation device 11 initially waits in step S1 for the start of the production machine. The evaluation unit 11 then carries out step S1 repeatedly until it receives a corresponding message from the control unit 10.

After production has started, the evaluation device 11 receives, in step S2, actual states and operating states at detection times ti. The actual states in this case are actual states of components 4, 5, 7, 9 detected by the sensors 15. For example, for drives 4, 5 and 7 the momentary actual positions x, y, z and the momentary drive currents Ix, Iy, Iz can be detected. For example, the momentary speed n and the corresponding drive current In can be detected for the rotary drive 9. These signals x, y, z, n, Ix, Iy, Iz, In can also be pre-processed if necessary. The operating states are operating states of the control device 10. These, for example, include the desired positions x*, y*, Z* and the desired speed n* of drives 4, 5, 7, 9. They can also include other variables such as a temperature T, the momentary processing state, such as workpiece machining, workpiece transport or workpiece change, or also other information.

In a step S3, the evaluation device 11 compares the states it receives with pre-defined state combinations. For example, it is possible to check whether the speed n of the rotary drive 9 is in a predetermined speed range or whether the change of one of the actual positions x, y, z is in a predetermined range, or, for example, whether a tool change is presently being carried out.

If the pre-defined state combination is fulfilled, the evaluation device 11 continues with steps 4 to 7. Otherwise it goes directly to step S8.

In step S4, the control device 11 selects predetermined states sent thereto. If, for example, it is shown on the basis of the actual position z of the drill 8 that this is presently not acting on the workpiece 2 and the speed n of the rotary drive 9 is in a predetermined speed range, the drive current In drawn by the rotary drive 9 is of particular significance.

In step S5, which is optionally carried out, the evaluation device 11 performs a pre-evaluation of the relevant states detected at the respective detection time ti (according to the example: the drive current In). Using this pre-evaluation, the evaluation device 11, in step S5, determines a pre-evaluation result. In this case, the pre-evaluation result is determined by the evaluation device 11, preferably exclusively on the basis of states that on one hand have been detected at the respective detection time ti and on the other hand have been selected as relevant.

In step S6, the evaluation device 11 itself assigns the relevant states (e.g. In) and/or the pre-evaluation result of the respective state combination determined in step S5. In step S7, the evaluation unit 11 stores, preferably permanently, the information assigned to the relevant state combination and the corresponding detection time ti, so that they are available for further evaluations. The term permanent in this case in the context of this invention means that the stored information is also retained in the event of an interruption or shutdown of the power supply. It does not, however, mean that the information cannot be deleted again. In the context of this invention, storage on a hard disk, in a battery-buffered RAM or in an EEPROM etc. is also, for example, included in the term permanent. However, a volatile storage would also be possible.

In step S8, the evaluation device checks whether it has already carried out steps S3 to S7 for all pre-defined state combinations. If it has not already done this, it goes on to step S9 where it selects another state combination which has not yet been checked. It then returns to step S3. Otherwise it continues on to step S10.

In step S10, the evaluation device 11 checks whether it has received information from the control device 10 to the effect that the production machine has finished machining workpiece 2. If this is not the case, the control unit 11 returns to step S2. Otherwise, the basic operation of the evaluation device 11 is ended.

Figure 3:
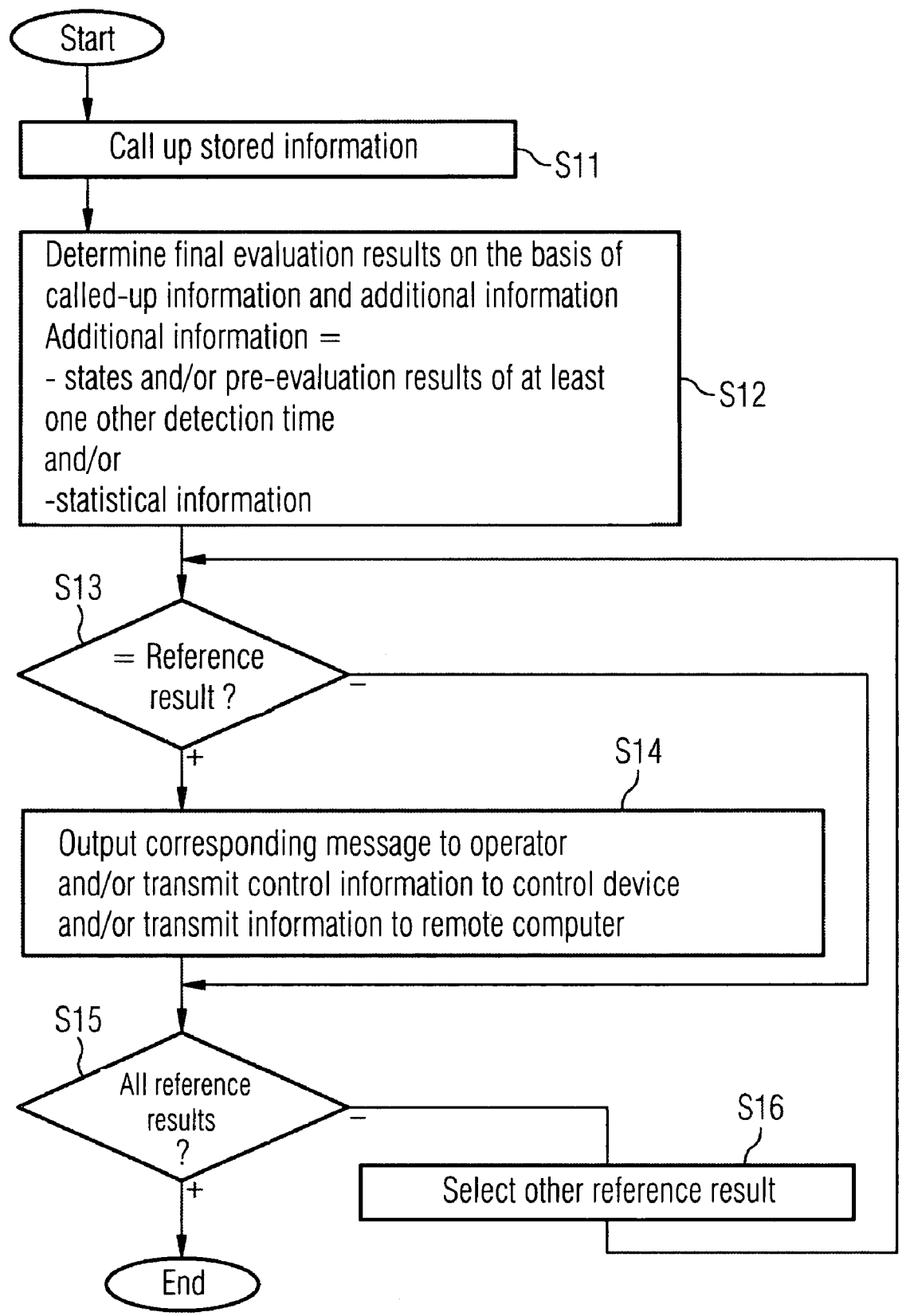

FIG. 3 shows further evaluations that can be carried out. These further evaluations can furthermore be carried out by the evaluation device 11 or, after reading the stored information, by a different device. It can be carried out in parallel with the procedure according to FIG. 2, be it with the same timing, in predetermined time intervals (e.g. once per hour) or only in response to a corresponding request by the operator 14.

According to FIG. 3, the evaluation device calls up the stored information (e.g. In) in step S11. In step S12 the evaluation device 11 then determines the final evaluation result on the basis of stored information and additional information. The additional information can, for example, be actual states of components 4, 5, 7, 9 of the production machine and/or operating states of the control device 10 that were detected at a time other than the respective time ti. Alternatively or additionally, the additional information can also be static information on the production machines, for example the precise configuration of the production machine, or on the basis of predictions determined from databases.

In step S13, the evaluation device 11 compares the final evaluation result with a pre-defined reference result. If the final evaluation result corresponds to the reference result, the evaluation device 11 outputs, in step S14, a corresponding message to the operator 14 of the production machine. The output in this case preferably takes place via a display unit 12. Other forms of output are also possible provided it is guaranteed that the operator 14 can directly perceive the message with his sense organs. Alternatively or additionally, control information can be sent to the control device 10 and/or via a computer-computer connection 18 to a remote computer 19.

In step S15, the evaluation device 11 checks whether it has already carried out steps S13 and S14 for all pre-defined reference results. If this is not the case, the evaluation unit 11 selects, in step S16, another pre-defined reference result and returns to step S13. Otherwise, the determination of the final evaluation result is also ended.

By means of the inventive method, a substantially more convenient prediction of the future behavior of the production machine is possible. In the event of a fault, a prediction regarding the fault which has occurred is also possible with substantially greater probability.

The invention claimed is:

1. An operating method for an evaluation device for a production machine, wherein the production machine manufactures a product under control of a control device, comprising:

provideing the evaluation device and the control device for the production machine, wherein the production machine comprising drives and other components;

storing desired positions, desired speeds and desired drive currents of the drives in the control device;

receiving actual positions, actual speeds and actual drive currents of the drives of the production machine by the evaluation device during manufacturing of a product, wherein the actual positions, speeds and drive currents are detected by sensors at detection times;

transmitting the desired positions, speeds and drive currents stored in the control device to the evaluation device;

comparing, using the evaluation device, the actual positions, speeds and drive currents of the drives and the desired positions, speeds and drive currents of the drives transmitted to the evaluation device with pre-defined state combinations, wherein the pre-defined state combinations include pre-defined position ranges, pre-defined speed ranges and pre-defined drive current ranges;

determining fulfilled state combinations based on the comparison, wherein a pre-defined state combination is fulfilled when the desired and actual positions, speeds and drive currents lie within the pre-defined position ranges, speed ranges and drive current ranges;

selecting relevant states from the fulfilled state combinations, wherein the selection is made by the evaluation device for each fulfilled state combination;

storing information of the relevant states together with the detection times by the evaluation device;

and providing the information and the respective detection time of the relevant states for an other evaluation.

2. The operating method as claimed in claim 1, wherein the evaluation device pre-evaluates the relevant states, and wherein the information includes pre-evaluation results determined as part of a pre-evaluation.

3. The operating method as claimed in claim 1, wherein the evaluation device determines final evaluation results based on information corresponding to the relevant states and additional information.

4. The operating method as claimed in claim 3, wherein the additional information includes actual states of the drives and the components of the production machine detected at one other detection time and operating states of the control device detected at one other detection time.

5. The operating method as claimed in claim 3, wherein the additional information includes static information of the production machine.

6. The operating method as claimed in claim 3, wherein the evaluation device compares the final evaluation results with pre-defined reference results, and wherein for each final evaluation result that corresponds to one of the pre-defined reference results the evaluation device:

outputs a message to an operator of the production machine, wherein the operator perceives the message with sense organs, transmits control information to the control device, wherein the control device controls the production machine according to the transmitted control information, and transmits information via a computer-computer connection to a remote computer.

* * * * *